United States Patent
Pinzl

(10) Patent No.: US 7,210,885 B2
(45) Date of Patent: May 1, 2007

(54) SUPPORTING BUSHING

(75) Inventor: Wilfried Pinzl, Tambach-Dietharz (DE)

(73) Assignee: EJOT GmbH & Co. KG (DE)

( * ) Notice: Subject to any disclaimer, the term of this patent is extended or adjusted under 35 U.S.C. 154(b) by 0 days.

(21) Appl. No.: 10/501,995

(22) PCT Filed: Jan. 20, 2003

(86) PCT No.: PCT/EP03/00501

§ 371 (c)(1),
(2), (4) Date: Jan. 19, 2005

(87) PCT Pub. No.: WO03/062653

PCT Pub. Date: Jul. 31, 2003

(65) Prior Publication Data

US 2005/0117997 A1  Jun. 2, 2005

(30) Foreign Application Priority Data

Jan. 22, 2002 (DE) .............................. 102 02 267

(51) Int. Cl.
*F16B 41/00* (2006.01)
(52) U.S. Cl. ...................... 411/353; 411/999
(58) Field of Classification Search ............... 411/353, 411/107, 999, 512, 80.5
See application file for complete search history.

(56) References Cited

U.S. PATENT DOCUMENTS

| | | | | |
|---|---|---|---|---|
| 1,057,975 A | * | 4/1913 | Newhall et al. ........... 411/80.5 |
| 1,499,071 A | * | 6/1924 | Pleister ..................... 411/80.5 |
| 3,137,336 A | * | 6/1964 | Wing ......................... 411/135 |
| 3,295,578 A | * | 1/1967 | Maloof ....................... 411/105 |
| 3,878,042 A | * | 4/1975 | Curulla et al. .............. 376/446 |
| 5,395,194 A | * | 3/1995 | Johnson et al. ............ 411/353 |
| 5,509,752 A | * | 4/1996 | Kocisek .................... 403/373 |
| 6,039,525 A | * | 3/2000 | Johnson .................... 411/353 |
| 6,059,503 A | | 5/2000 | Johnson |
| 6,478,519 B1 | * | 11/2002 | Genick, II ................. 411/353 |
| 6,682,282 B2 | * | 1/2004 | Allen ........................ 411/353 |

FOREIGN PATENT DOCUMENTS

| | | |
|---|---|---|
| AT | 137 468 | 5/1934 |
| DE | 195 34 034 | 3/1997 |
| GB | 636 858 | 5/1950 |
| GB | 908 912 | 10/1962 |

* cited by examiner

Primary Examiner—Flemming Saether
(74) Attorney, Agent, or Firm—Banner & Witcoff, Ltd.

(57) ABSTRACT

A supporting sleeve configured for introduction into a penetration in a component. The hole of the supporting sleeve is penetrated by a fixing pin that is insertable into a carrier so as to fix the component on a carrier. The supporting sleeve includes a closed ring-shaped cross section and a plurality of axially and inwardly extending recesses extending over the entire length of the supporting sleeve and each of the recesses is formed by inwardly bent walls and a base connecting those walls, the walls being generally radially oriented and configured such that when radial pressure is applied to the supporting sleeve upon introduction into the penetration, each recess moves closer to each other.

8 Claims, 2 Drawing Sheets

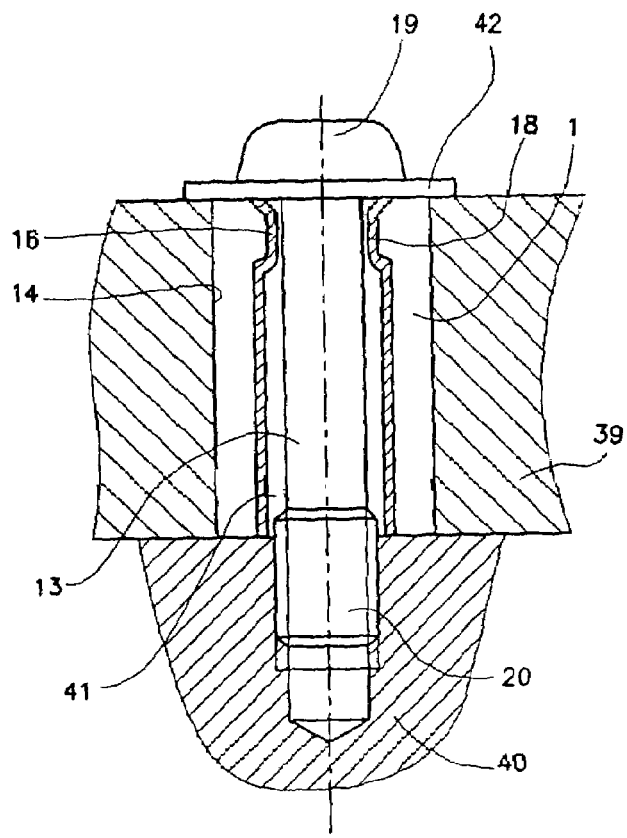
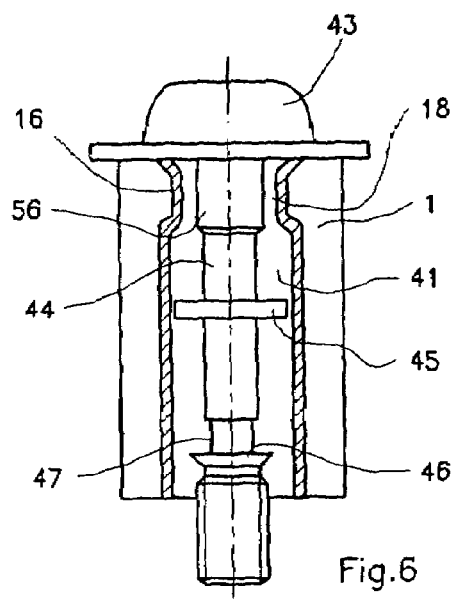
Fig.5
Fig.6
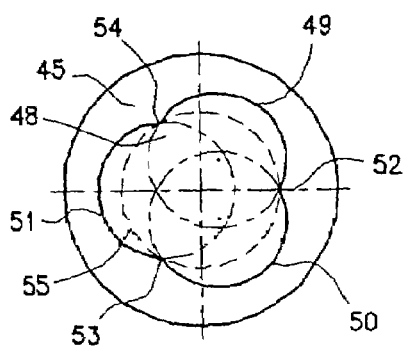
Fig.7
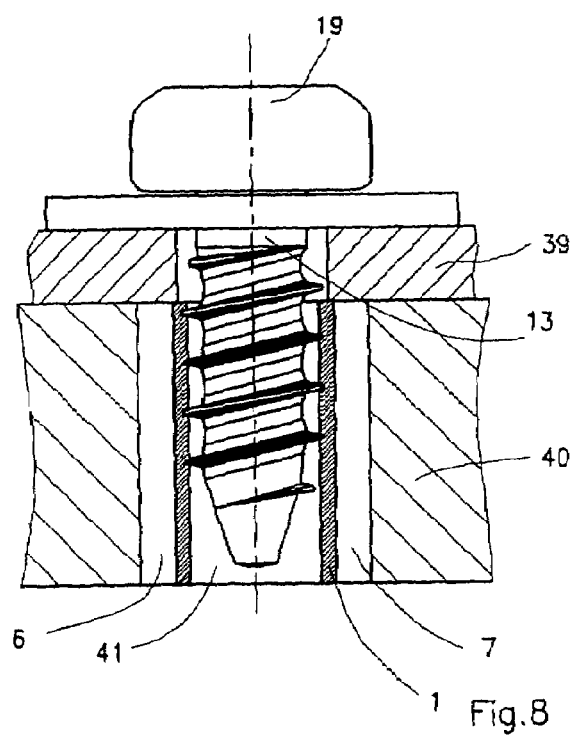
Fig.8

SUPPORTING BUSHING

BACKGROUND OF THE INVENTION

The invention relates to a supporting sleeve, that is introducible into a penetration in a component. Further the component may be fixed on the carrier so that the hole of the supporting sleeve is penetrated by a fixing pin, particularly a screw, that is insertable into the carrier.

Such a supporting sleeve is disclosed in DE-OS 195 34 034 A1. The supporting sleeve serves to be inserted into the penetration in a component and to accept a screw with which the component is screwed to a carrier. The forces exerted on the component by the head of the screw and by the carrier are absorbed by the supporting sleeve, which is fixedly anchored in the penetration in the component and which consequently protects any sensitive material of the component against excessive compressive forces exerted by the screw. In order to provide the supporting sleeve with a certain radial flexibility with which the supporting sleeve is supported in the penetration in the component, the supporting sleeve is provided with a longitudinal slit which, as a result of the thereby imparted spring effect of the supporting sleeve, facilitates the insertion of the supporting sleeve into the penetration in the component and which exerts a certain clamping effect in the penetration.

So that the known supporting sleeve is able sufficiently to withstand the pressure exerted by a screw, i.e. in particular the pressure of the screw head on the respective end face of the supporting sleeve, the supporting sleeve must have a relatively large wall thickness, which, however, has the consequence that, despite its slit, the supporting sleeve does not possess any especially great elasticity. The large wall thickness allows the supporting sleeve to be compressed only if relatively high radial forces are applied.

SUMMARY OF THE INVENTION

Further known from British patent specification GB 636,858 A is a wall plug which is formed by a sleeve provided with a plurality of axially extending recesses. The recesses consist of folds whose walls meet at the base of the fold. This known wall plug is not formed and used as a supporting sleeve. As an inserted wall plug, its purpose is to provide a secure seat in a prepared hole in a wall and to prevent its rotation when a screw is being inserted and screwed in.

The object of the invention is to create a supporting sleeve whose design makes it possible to select the spring force of the supporting sleeve over a considerable margin, the absorption of the compressive forces from the screw being made possible by correspondingly large end faces of the supporting sleeve.

The object of the invention is achieved in that the supporting sleeve is formed in cross section as a closed ring and includes a plurality of axially extending recesses extending over the entire length of the supporting sleeve, therefore, when radial pressure is applied to the supporting sleeve, the walls of the recesses come closer to each other as the bases of the recesses bend in.

The design of the supporting sleeve with a plurality of continuous recesses extending in the longitudinal direction of the supporting sleeve results in a corresponding number of bases of said recesses, said bases forming the region of the supporting sleeve in which the material of the supporting sleeve can be bent. An advantageous design of the supporting sleeve results when the supporting sleeve is provided with four recesses, with the result that four bases are available for bending in, said bases providing the supporting sleeve with a considerable flexibility. Of course, the supporting sleeve may also be provided with three or even with two recesses; however, the flexibility of the supporting sleeve naturally increases with the number of recesses, this deciding the elasticity of the supporting sleeve. On account of the arrangement of a plurality of recesses, there results at the end face of the supporting sleeve a linear cross section of the supporting sleeve, this serving in the radial direction for a corresponding width of the supporting surface for the head of a screw or other fixing pin. The same applies, of course, also to the opposite end face of the supporting sleeve, which, when the component is fixed to a carrier, is in contact therewith.

The fixing pin may primarily be a screw; however, it is also possible to employ a nail-like pin if the leading end of the nail allows it to be fixed in the carrier.

Advantageously, the recesses are uniformly distributed over the ring, this resulting in a correspondingly uniform distribution of the elasticity of the supporting sleeve over its entire circumference.

In order to captively connect the supporting sleeve to the fixing pin, the bases of the recesses are advantageously so designed that the bases of the recesses have inwardly pointing projections at one end of the supporting sleeve. Owing to a widening of the diameter of the fixing pin, particularly by the thread of a screw, the projections form a constriction of the hole of the supporting sleeve in relation to a widening of the diameter of the fixing pin, with the result that a screw introduced into the supporting sleeve with a correspondingly long neck situated between the head and the thread is captively connected to the supporting sleeve. In order to introduce the screw into the supporting sleeve, the screw is either pressed through the supporting sleeve, the supporting sleeve yielding because of its elasticity, or the screw is simply screwed into the hole of the supporting sleeve until the projections at the bases of the recesses come into the region of the neck of the screw.

Another type of captive connection between supporting sleeve and fixing pin consists in sliding onto the fixing pin a washer, which is supported on one side by the constriction formed by the projections and on the other side by the widening of the fixing pin, wherein said widening may, as indicated, be in particular a thread of a screw.

So that the washer can be slid effortlessly onto a screw serving as the fixing pin, it is advantageous for the opening of the washer to be of such design that it is determined by three overlapping circular areas, the centre points of said circular areas lying on a circular arc whose centre point coincides with the axis of the supporting sleeve, the three centre points of the circular areas being uniformly distributed on the circular arc. This results in a circle-like opening of the washer with three symmetrically disposed circular-arc-shaped recesses and obtusely converging interfaces of the circular arcs, which project as obtuse corners into the opening of the washer and thereby determine a circular ring whose diameter is smaller than the diameter of the widening of the fixing pin or thread of the screw.

Advantageously, the recesses may be slightly axially elongated in comparison with the bulges (i.e. the radially external wall parts of the supporting sleeve) which connect them, the consequence of this being that the carrier with the fixing pin is able, if necessary, to exert slight oscillations in relation to the component without these being transferred to the component, because, with this type of connection, the elongations of the recesses are fixedly connected to the carrier whereas the component is elastically held by the bulges which support the component.

In order further to increase the elasticity of the supporting sleeve, the bulges connecting the recesses may be so designed in cross section to form a continuous wave-like valley. In this case, there is a certain bendability of the bulges also in the region of the wave-like valley. At any rate, this makes it possible to increase the elasticity of the component in relation to the screw.

The walls of the recesses may be aligned obliquely with respect to the radial direction in such a manner that the recesses each have a uniformly repeating skew position in relation to the radial direction. Said skew position may be such that, when a screw (serving as fixing pin) is tightened, there results a driving torque on the end face of the supporting sleeve facing the head of the screw, said driving torque being opposed by a correspondingly obliquely positioned wall, the oblique positioning being such that the forces acting on the end face extend more or less along the direction of the respective walls. In this design, the walls are able to effectively absorb the occurring frictional forces, this preventing the supporting sleeve from itself rotating when a screw is tightened.

The supporting sleeve can also be advantageously so designed that the recesses determining the hole in the supporting sleeve are of such an undersize in relation to the fixing pin in the form of the screw that the screw cuts an internal thread when being screwed into the supporting sleeve. In this case, therefore, there is a special support between the supporting sleeve and the screw via the thread of the screw.

The supporting sleeve may, in particular, be produced from metal. However, it is also possible for it to be injection-moulded from a hard, elastic synthetic material. During the production of the supporting sleeves, the projections for securing a screw are then either pressed inwardly or are formed during injection moulding through appropriate design of the mould.

BRIEF DESCRIPTION OF THE DRAWINGS

Example embodiments of the invention are shown in the drawings, in which:

FIG. 5 shows an assembly of supporting sleeve and a component fixed to a carrier by means of the supporting sleeve;

FIG. 6 shows a supporting sleeve with a washer for the captive connection of supporting sleeve and screw;

FIG. 7 shows a view of the washer;

FIG. 8 shows an assembly of supporting sleeve and a carrier with component, the supporting sleeve having an undersize in relation to the thread of the screw.

DETAILED DESCRIPTION OF THE DRAWINGS

Figure 1A:
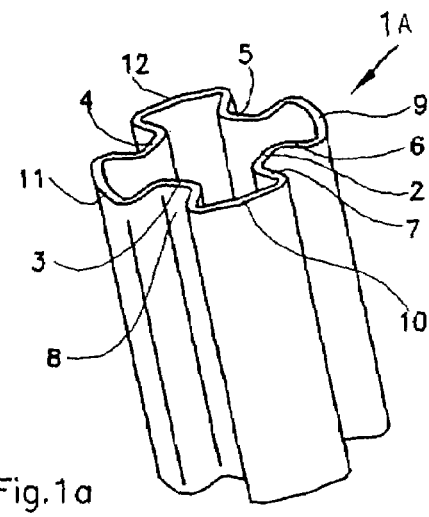
FIGS. 1a and b show the supporting sleeve in a perspective view and in a top view.
Figure 2B:
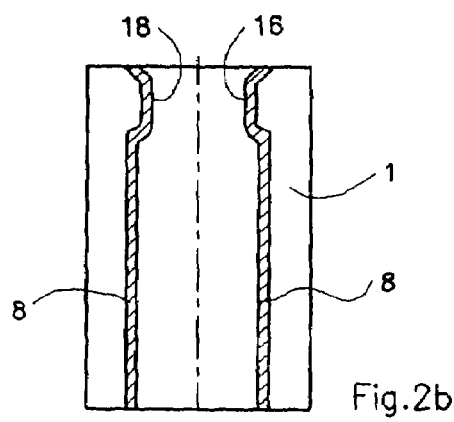
FIGS. 2a and b show a modification of the supporting sleeve from FIG. 1 with inwardly pointing projections, in a top view and in section.
Figure 1B:
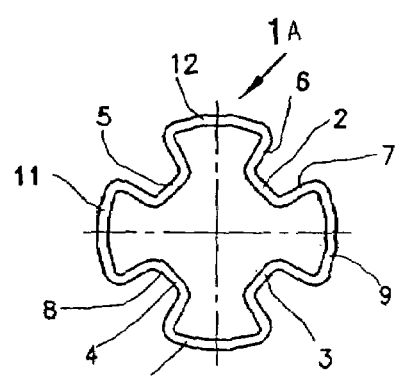

FIG. 1a shows the supporting sleeve 1A in a perspective view, the supporting sleeve 1 in this case comprising the four recesses 2, 3, 4 and 5. Said recesses are also apparent from the top view of the end face of the supporting sleeve 1A in FIG. 1b. The recesses are each formed by the two walls 6 and 7 as well as by the base 8. Extending between the recesses 2 to 5 are the bulges 9,10,11 and 12, which connect them.

This design of the supporting sleeve 1A allows the supporting sleeve 1A to be radially compressed as a result of the flexibility of the material of the supporting sleeve and makes it possible for the supporting sleeve to be introduced into a penetration in a component, the diameter of said penetration being smaller than the diameter of the supporting sleeve shown in its relaxed position in FIG. 1a and b. When the supporting sleeve 1A is radially compressed, there results primarily a bending-in of the bases 8, the walls 6 and 7 coming closer to each other. This is accomplished in uniform manner owing to the uniform construction of the supporting sleeve in respect of all four recesses 2 to 5, this making it possible to achieve a considerable elasticity of the supporting sleeve 1A. With regard to the introduction of the supporting sleeve 1A and its function in a component, reference is made to the below-given explanatory remarks in relation to FIG. 5. It can be seen from FIG. 5 that the therein shown supporting sleeve 1A accepts a screw 13 in its hole 41.

Figure 2A:
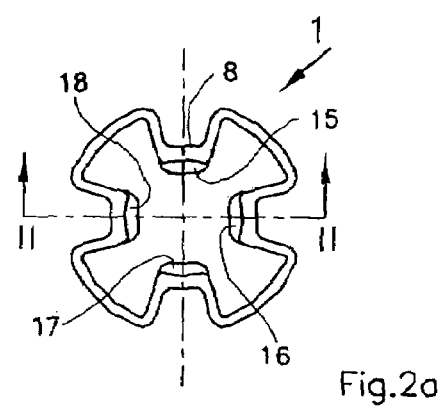

In order captively to connect such a screw to the supporting sleeve 1, in FIGS. 2a and b the bases 8 are provided with inwardly pointing projections 15, 16, 17 and 18, which, as becomes apparent from section II—II from FIG. 2a, are provided on one side of the supporting sleeve 1. Said projections 16 and 18, also shown in FIG. 5, serve to prevent the screw 13 from sliding out of the supporting sleeve 1 in the direction of its head 19. The screw 13 is prevented from doing this by the diameter of its thread 20, the diameter of which is greater than the diameter provided by the projections 16 and 18 (as well as 15 and 17 in FIG. 2a).

Figure 3:
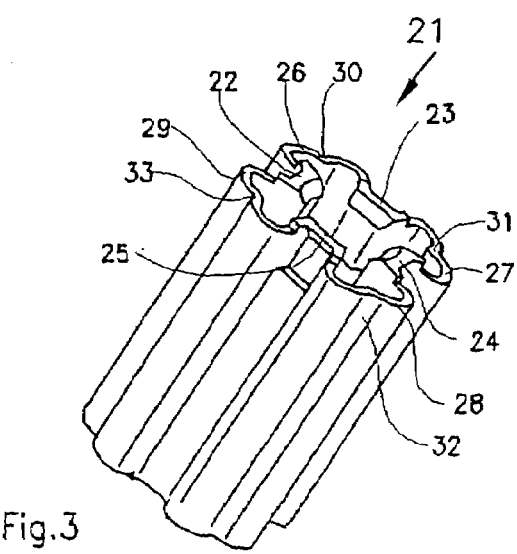
FIG. 3 shows a perspective view of the supporting sleeve with recesses, said recesses being axially elongated in relation to the bulges which connect them, as well as with a wave-like valley in each bulge connecting two recesses.

FIG. 3 shows a modification of the design of the supporting sleeve 1 in FIGS. 2a and b, namely the supporting sleeve 21 in a perspective view, said supporting sleeve 21, like supporting sleeve 1, having four recesses 22, 23, 24 and 25. Said recesses with their bases and walls are axially slightly longer than the bulges 26, 27, 28 and 29 connecting the recesses 22 to 25. The same elongation of the recesses 22 to 25 is provided on the non-visible opposite side of the supporting sleeve 21. Owing to said elongations, a screw penetrating the supporting sleeve 21 is supported with its screw head on said elongations and on a carrier (see FIG. 5), the consequence of which is that the pressure exerted by the screw on the supporting sleeve 21 is absorbed by the aforementioned elongations, which are thus rigidly clamped. Conversely, the bulges 26, 27, 28 and 29 are left with a certain flexibility, which means that a component accepting the supporting sleeve 21 and fixedly enclosing the supporting sleeve 21 is able, within the range of an elasticity of the aforementioned bulges, to move slightly in relation to the fixedly clamped elongations of the supporting sleeve 21.

The supporting sleeve 21 is further provided in the region of its bulges 26 to 29 with inwardly pointing wave-like valleys 30, 31, 32 and 33, which give the supporting sleeve 21 a further elasticity, since, because of the wave-like valleys 30 to 33, the bulges 26 to 29 can likewise be compressed slightly.

Figure 4:
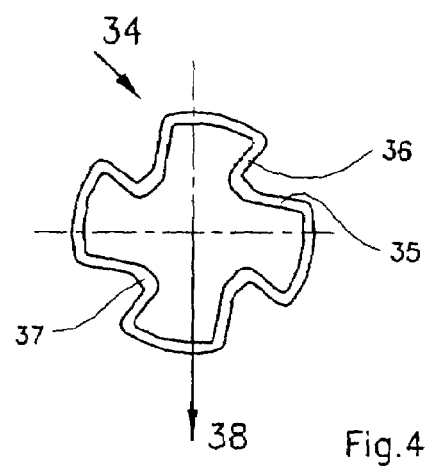
FIG. 4 shows a modification of the supporting sleeve with walls of the recesses extending obliquely with respect to the radial direction.

FIG. 4 shows the top view of the end face of a supporting sleeve 34 in which the walls 35 and 36 of the recesses 37 extend obliquely with respect to the radial direction, which is indicated by the arrow 38. The oblique position of the aforementioned walls is repeated in all four recesses of the supporting sleeve 34. When a torque in the clockwise direction of rotation is exerted on said supporting sleeve (by a screw, positioned on the elongations in FIG. 3, with its screw head), the wall 36 is supported against the wall of the penetration in the component and in this manner provides a particular resistance against the rotation of the supporting sleeve 34 in the component.

FIG. 5 shows the aforementioned assembly of supporting sleeve 1 with component 39 and carrier 40. The supporting sleeve 1 has been pressed into the penetration 14 in the component 39. Inserted through the hole 41 of the supporting sleeve 1 is the screw 13, which is supported against the washer 42 under the screw head 19 and which, when tightened, presses with the washer 42 on the respective end face of the supporting sleeve 1. The end of the screw 13, provided with the thread 20, is screwed into the carrier 40 and is tightened with respect to the latter, this establishing the connection between component 39 and carrier 40. The supporting sleeve 1 removes from the component 39 the compressive forces emanating from the screw 13, with the result that a component 39 made of a sensitive material is unable to be squeezed together in the region of the washer 42.

FIG. 6 shows a variant of the connection presented in FIG. 5 in which the screw 43 carries the washer 45 in the region of its neck 44. The washer 45 is hindered with regard to its mobility on the neck 44 by the thicker part 56 of the screw 43 and also by the collar 46 formed on the neck 44. This design prevents the screw 43 from being able to be separated from the supporting sleeve 1. The collar 46 is formed during the production of the screw 43 in a state in which the washer 45 is already supported by the neck 44. Said forming of the collar 46 results in the tapering 47, shown in FIG. 6, of the neck 44. To enable the screw 46 with the washer 45 to be introduced into the supporting sleeve 1 from the side of the projections 16 and 18 into the hole 41 of the supporting sleeve 1, there is provided the thicker part 56, the washer 45 coming up against said thicker part 56 when the screw 43 is introduced into the supporting sleeve 1.

The washer 45 is shown in an enlarged top view in FIG. 7. The opening 48 of the washer 45 is defined here by three overlapping circular areas drawn with broken lines, the circular edges 49, 50 and 51 of which meet at the corners 52, 53 and 54 and thus form the opening 48 with three recesses, into each of which fits the neck 44 of the screw 43 in FIG. 6. The corners 52, 53 and 54 lie on a circular arc, indicated by the dash-dotted line, the diameter of which is smaller than the diameter of the screw 43 in the region of the thicker part 45 or the diameter of the collar 46. Thanks to this design of the opening 48 of the washer 45, it is possible for the screw 43 with its neck 44 to come up against each of the edges 49, 50 and 51, this therefore guaranteeing a considerable play between the screw 43 and the washer 45. The consequence of this is that the carrier, which defines the position of the screw 43 screwed into it, provides the component fixed to the carrier with the supporting sleeve 1 with the amount of play made possible by the edges 49, 50 and 51. Consequently, this type of connection of captive screw 43 together with the supporting sleeve 1 as well as a component and a carrier (reference characters 39 and 40 according to FIG. 5) guarantees the compensation of considerable tolerances in the assembly of component and carrier using the supporting sleeve 1. FIG. 8 shows the assembly of supporting sleeve 1, the carrier 40 and the component 39, in which the screw 13 has been screwed into the supporting sleeve 1, thereby cutting an internal thread, for which purpose the recesses determining the hole 41 in the supporting sleeve 1 (of which the walls 6 and 7 can be seen in FIG. 8) are of a corresponding undersize in relation to the thread of the screw 13. This results in a particular fixing of the screw 13 in the supporting sleeve 1 by the internal thread cut into the supporting sleeve 1.

What is claimed is:

1. A supporting sleeve (1, 21, 34) configured for introduction into a penetration (14) in a component (39), wherein a hole (41) of said supporting sleeve (1, 21, 34) is penetrated by a fixing pin (13, 43) configured to be insertable into a carrier (40) so as to fix the component (39) on a carrier (40), comprising:
   a closed ring-shaped cross section; and
   a plurality of axially and inwardly extending recesses (2, 3, 4, 5, 22, 23, 24, 25) extending over the entire length of the supporting sleeve (1, 21, 34), each of the recesses (2, 3, 4, 5, 22, 23, 24, 25) being formed by inwardly bent walls (6, 7, 35, 36) and a base (8) having inwardly pointing projections (15, 16, 17, 18) at one end of the supporting sleeve (1, 21, 34) for captive holding of the fixing pin (13) and connecting those walls, the walls (6, 7, 35, 36) being generally radially oriented and configured such that radial pressure is applied to the supporting sleeve (1, 21, 34) and each recess moves closer to each other upon introduction into the penetration (14).

2. The supporting sleeve of claim 1, wherein the recesses (2, 3, 4, 5; 22, 23, 24, 25) are uniformly distributed over the ring-shaped cross section.

3. The supporting sleeve of claim 1, the projections (15, 16, 17, 18) being configured to form a constriction of the hole (41) of the supporting sleeve of the fixing pin (13), wherein the fixing pin (13) has a diameter greater than a diameter of the hole (41).

4. The supporting sleeve of claim 3, wherein the constriction is configured to support a washer (45) guided by the fixing pin (43).

5. The supporting sleeve of claim 4, further comprising three overlapping circular areas that determine an opening (48) of the washer (45), wherein a center point of each of said circular areas lies on a circular arc (55), wherein the circular arc has center points that coincide with the axis of the supporting sleeve and wherein the three center points of the circular areas are uniformly distributed on the circular arc (55).

6. The supporting sleeve of claim 1, wherein the fixing pin is a screw.

7. The supporting sleeve of claim 1, wherein the supporting sleeve further comprises bulges between the recesses, the bulges providing the external contact surfaces for engaging the penetration when the supporting sleeve is introduced into the penetration.

8. The supporting sleeve of claim 1, wherein each base (8) is configured to bend inwardly in response to the application of radial pressure upon introduction into the penetration (14).

* * * * *